Aug. 15, 1961 W. J. O'SULLIVAN, JR 2,996,212
SELF SUPPORTING SPACE VEHICLE
Filed Aug. 20, 1959

INVENTOR
WILLIAM J. O'SULLIVAN, JR.

BY
ATTORNEYS

2,996,212
SELF SUPPORTING SPACE VEHICLE
William John O'Sullivan, Jr., Hampton, Va., assignor to the United States of America as represented by the Administrator of the National Aeronautics and Space Administration
Filed Aug. 20, 1959, Ser. No. 835,153
3 Claims. (Cl. 220—1)
(Granted under Title 35, U.S. Code (1952), sec. 266)

The invention described herein may be manufactured and used by or for the Government of the United States of America for governmental purposes without the payment of any royalties thereon or therefor.

This invention relates generally to aerial vehicles, and more particularly to an upper atmosphere vehicle or space balloon.

In order to satisfy the present day quest for knowledge of the scientific mysteries of the upper atmosphere, or outer space, a need has arisen for a flexible and lightweight space vehicle which can be carried aloft in a compact package and, at a preselected distance, erected to assume a particular configuration. Although the erection can be readily accomplished by the use of an inflating medium, in view of the likelihood of puncture of the skin material of the space vehicle, or balloon, by space debris, such for example as micrometeorites, the internal pressure of the inflating medium cannot be relied upon to maintain the desired vehicular configuration.

Accordingly, it is an object of this invention to provide a space vehicle of a new and unique construction.

It is also an object of the present invention to provide a flexible and lightweight space balloon or probe envelope capable of being alternatively and repeatedly folded into a compact package and erected to assume a defined configuration.

Another object of the instant invention is to provide a new and improved flexible and lightweight space balloon or satellite construction capable of being inflated into a desired configuration and of retaining said desired configuration independently of the inflating medium.

A further object of this invention is to provide a new and improved electromagnetic wave signal reflecting space vehicle.

Other objects and many of the attendant advantages of this invention will be readily appreciated as the same become better understood by reference to the following detailed description when considered in connection with the accompanying drawing wherein.

Figure 1:
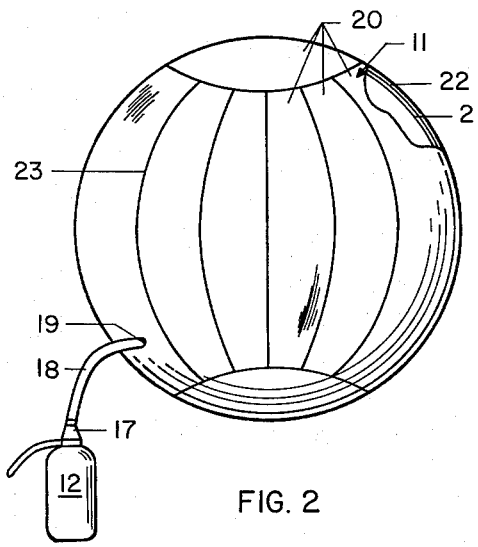
FIG. 1 is a view of a space vehicle of the present invention in a compact condition.

Referring now to the drawing wherein like reference numerals designate identical or corresponding parts throughout the several views, and more particularly to FIG. 1 whereon a space vehicle 11 of a spherical configuration constructed in accordance with the present invention is shown in a folded condition arranged about a container of compressed gas 12 upon a tray 13 thereby providing a compact package readily positionable within a nose cone 14 detachably mounted upon a propelling vehicle, such for example as the rocket 15. The rocket 15 upon initiation carries the nose cone and its lightweight package into the upper atmosphere, where at some preselected height, it is separated from the rocket by conventional means, not shown. Upon separation of the nose cone 14 from the propelling vehicle, the package is ejected therefrom into space by conventional means, such for example as the coil spring 16, whereupon the gas cylinder 12 is actuated to unfold and inflate the space vehicle by injection of an inflating medium, such for example as nitrogen gas through a valve arrangement 17 connected to a stem 18 inserted within an opening 19 of the space vehicle 11.

Figure 2:
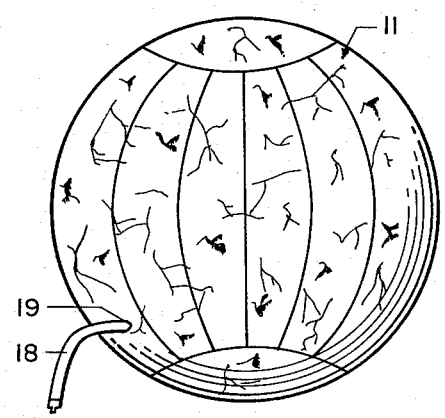
FIG. 2 is a view, partially in section, of a space vehicle in an inflated condition.

As more clearly shown in FIG. 2, the skin of the space vehicle 11 is composed of a plurality of segments 20 of a two ply laminated skin joined together by a conventional flexible adhesive. The laminated skin consists of a thin base layer, or film, 21 of a tough and flexible material such for example as rubber, parachute cloth or plastic. A preferred material is the polyester "Mylar" which exhibits a high strength in shear. The base layer 21 is covered with a thin metallic layer, or film, 22, of a material having a high ratio of stiffness per weight for unit surface area, such for example as aluminum. The metallic coating preferably forms the external surface of the segments 20 in order to prevent deterioration in the strength and flexibility characteristics of the base layer material 21 by ultra-violet and other solar radiations present in space. In order to more fully protect the base layer 21, a simple lap joint or a butt joint with an underlying lap plate 23 type juncture between each of segments 20 of the space vehicle skin is preferably utilized.

Figure 3:
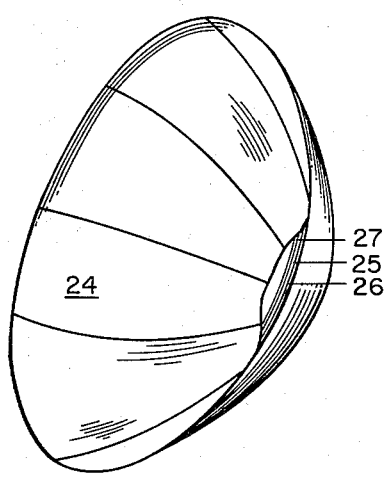
FIG. 3 is a view of a spherical space vehicle in self-sustaining condition; and, FIG. 4 is a view, partially in section, of an alternative embodiment of a space vehicle in accordance with the instant invention.

The pneumatic erection of the spherical space vehicle by the gas cylinder 12 continues until the internal pressure of the inflating gas within the space vehicle 11 develops a permanent set in the metallic coating 22 by subjecting it to tensile stresses exceeding the yield point thereof thereby removing the major wrinkles developed in the skin while in the folded condition. The removal of all of the coarse folds in the skin material can be considered as a visual indication tha the metallic coating has yielded. Valve 17 is designed to detach the stem 18 of the space vehicle 11 from the cylinder 12 when the cylinder is exhausted thereby allowing the inflating gas within the space vehicle 11 to leak off through opening 19. Reduction of the internal pressure of the spherical space vehicle results in the development of residual wrinkles in the yielded laminated skin, which in conjunction with the inherent stiffness of the skin material, results in a space vehicle adapted to support itself in a particular configuration in the absence of internal pressure exceeding the external atmospheric pressure thereupon, as shown in FIG. 3.

Figure 4:
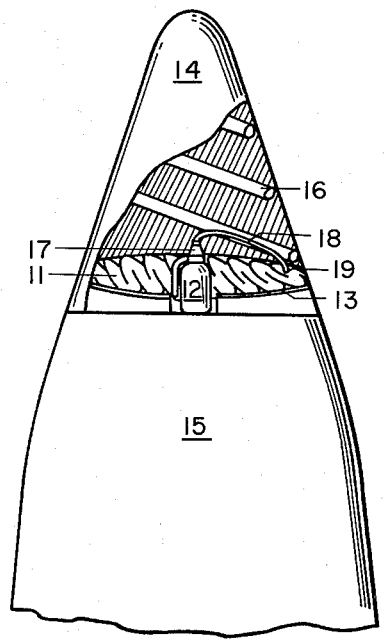

It has been found that for small sized spherical configurations, such for example as one having a diameter of approximately 30 inches, a two ply laminated skin material exhibits sufficient stiffness to allow for self retention of the configuration. However, other configurations, as well as larger sized spherical configurations, such for example as one having a diameter of twelve feet, have been found to preferably utilize a three ply laminated skin material exhibiting a greater degree of stiffness. FIG. 4 of the drawing illustrates a space vehicle 24 of a dish-like configuration, such for example as a parabolic reflector for electromagnetic waves, which requires a three ply laminated skin. As shown in FIG. 4, the skin is composed of a central layer 25 of flexible and tough material such for example as "Mylar" to both faces of which is adhesively bonded a metallic layer 26 and 27, such for example as aluminum or the like.

It is to be understood that although the invention describes release of the inflating medium through the aperture 19 in the vehicle envelope, it is also contemplated that the aperture 19 may be provided with a valve to prevent release of the inflating medium. In this instance, the configuration will be maintained by the inflating medium until puncture of the envelope by space debris occurs, at which time the medium will escape and the configuration will then be self retained.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A space vehicle operable in an interplanetary spatial vacuum comprising an envelope formed of a thin laminated material having a plastic film and a metallic film bonded to at least one side thereof, and means for developing an internal pressure within said envelope of a magnitude to stress said laminated material beyond its yield point but less than the ultimate tensile strength thereof to establish a permanent set therein.

2. A space vehicle operable in an interplanetary spatial vacuum as defined by claim 1 wherein said metallic film is composed of aluminum.

3. An inflatable space vehicle adapted to be compactly folded into a small package and subsequently expanded into a large permanent structure for operation in an extraplanetary spatial vacuum or low density atmosphere, comprising a plurality of segments of thin laminated material each comprised of a polyester film and a metallic film, at least one of said segments having an aperture formed therein, said segments being joined to one another to define an envelope, and pressure producing means communicating with the interior of said envelope through said aperture for producing sufficient pressure to internally pressurize said envelope and stress said laminated material in tension beyond the elastic limit thereof but less than the ultimate tensile strength thereof to establish permanent set therein.

References Cited in the file of this patent

UNITED STATES PATENTS

| | | |
|---|---|---|
| 2,151,336 | Scharlan | Mar. 21, 1939 |
| 2,163,531 | Wettstein | June 20, 1939 |
| 2,503,190 | Branson | Apr. 4, 1950 |
| 2,503,191 | Branson | Apr. 4, 1950 |
| 2,673,826 | Ness | Mar. 30, 1954 |
| 2,730,626 | Varney | Jan. 10, 1956 |
| 2,765,251 | Williams | Oct. 2, 1956 |
| 2,809,130 | Rappaport | Oct. 8, 1957 |
| 2,880,446 | Benedict et al. | Apr. 7, 1959 |
| 2,888,675 | Pratt et al. | May 26, 1959 |

OTHER REFERENCES

Aviation Week, Aug. 5, 1957, pages 76 and 77.

UNITED STATES PATENT OFFICE

CERTIFICATE OF CORRECTION

Patent No. 2,996,212                        August 15, 1961

William John O'Sullivan, Jr.

It is hereby certified that error appears in the above numbered patent requiring correction and that the said Letters Patent should read as corrected below.

Column 2, line 36, for "tha" read -- that --; column 4, line 22, for "2,880,446" read -- 2,880,496 --.

Signed and sealed this 2nd day of January 1962.

(SEAL)
Attest:

ERNEST W. SWIDER                          DAVID L. LADD
Attesting Officer                           Commissioner of Patents